United States Patent [19]
Patterson

[11] Patent Number: 5,233,760
[45] Date of Patent: Aug. 10, 1993

[54] ANGULAR MEASURING MECHANISM

[76] Inventor: E. Ennalls Patterson, 2007 Ryan's Run, Lansdale, Pa. 19446

[21] Appl. No.: 922,385

[22] Filed: Jul. 31, 1992

[51] Int. Cl.⁵ .............................................. G01C 9/26
[52] U.S. Cl. .......................................... 33/376; 33/389; 33/451
[58] Field of Search .............. 33/384, 385, 386, 387, 33/388, 389, 376, 374, 375, 365, 379, 451, 370, 371, 341, 343, 353

[56] References Cited

U.S. PATENT DOCUMENTS

| | | | |
|---|---|---|---|
| 1,241,341 | 9/1917 | Chambers | 33/376 X |
| 1,489,572 | 4/1924 | Bennewitz | 33/376 |
| 1,683,065 | 9/1928 | Carpenter et al. | 33/388 X |
| 1,969,052 | 8/1934 | West | 33/376 |
| 2,386,833 | 10/1945 | Baldwin | 33/376 X |
| 2,541,880 | 2/1951 | McMillan et al. | 33/388 |
| 3,196,552 | 7/1965 | Richards | 33/366 |

FOREIGN PATENT DOCUMENTS

| | | | |
|---|---|---|---|
| 129433 | 8/1946 | Australia | 33/389 |
| 1938700 | 4/1971 | Fed. Rep. of Germany | 33/388 |
| 14912 | 6/1968 | Japan | 33/388 |
| 444852 | 3/1930 | United Kingdom | 33/388 |

Primary Examiner—Thomas B. Will
Attorney, Agent, or Firm—Joseph W. Molasky & Associates

[57] ABSTRACT

A module for measuring level, plumb and various angles by a simple hand manipulation. The module, which contains a bubble in a vial, is in one modality located in a carpenter's leveling bar and is slidable therein so that it may always be oriented at eye level for ease of viewing. The module is compact in size and design for ease in carrying on one's person and, it may be attached to a framing square or a straight edge, for example, such that measuring of the horizontal, vertical, and acute or obtuse angles may be readily accomplished in a portable fashion. In another mode, the measuring module which is formed upon a four-sided support member may be utilized without any additional structural element to provide a self contained angular measuring mechanism.

19 Claims, 3 Drawing Sheets

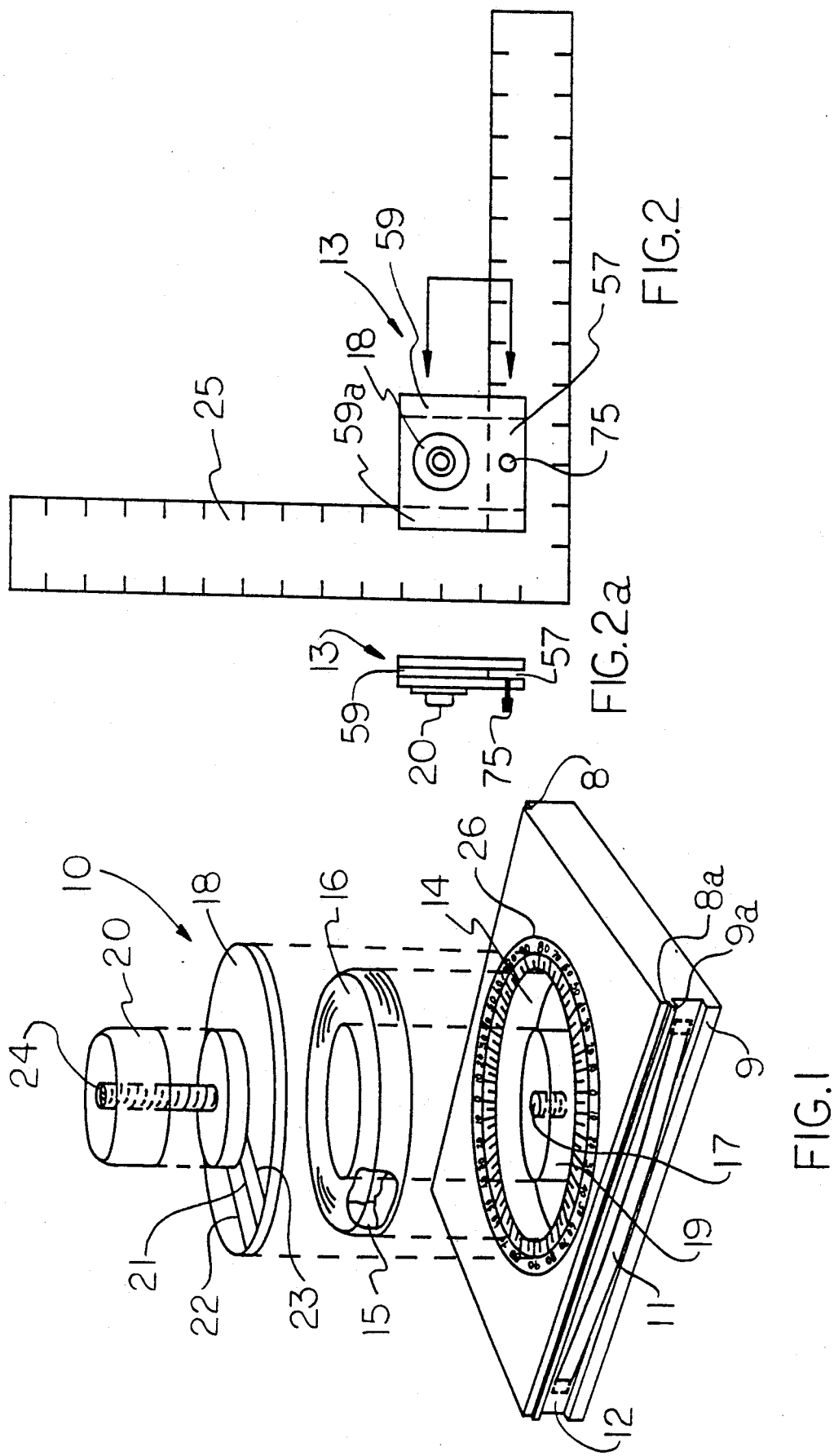

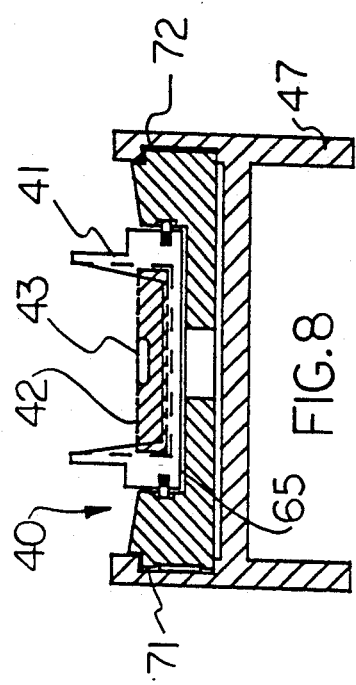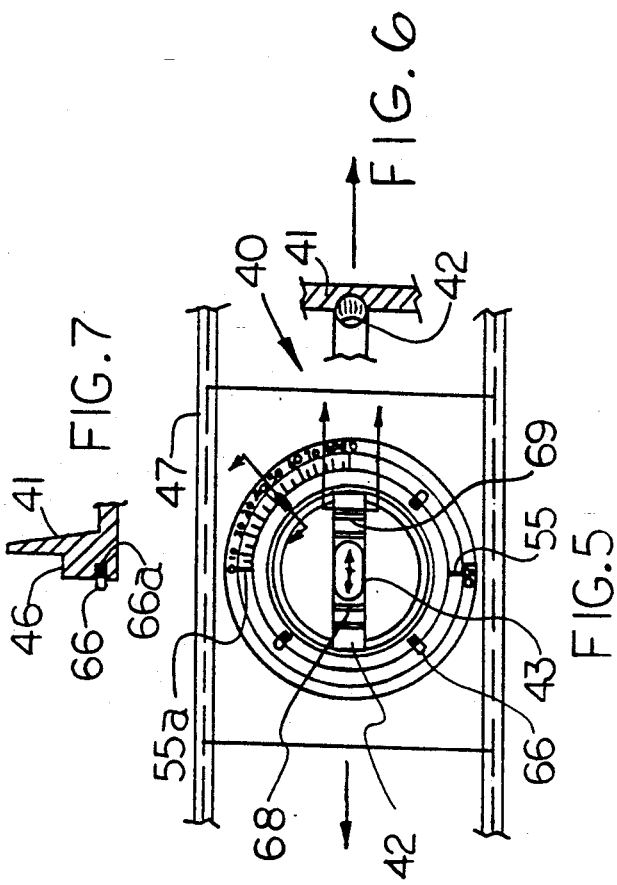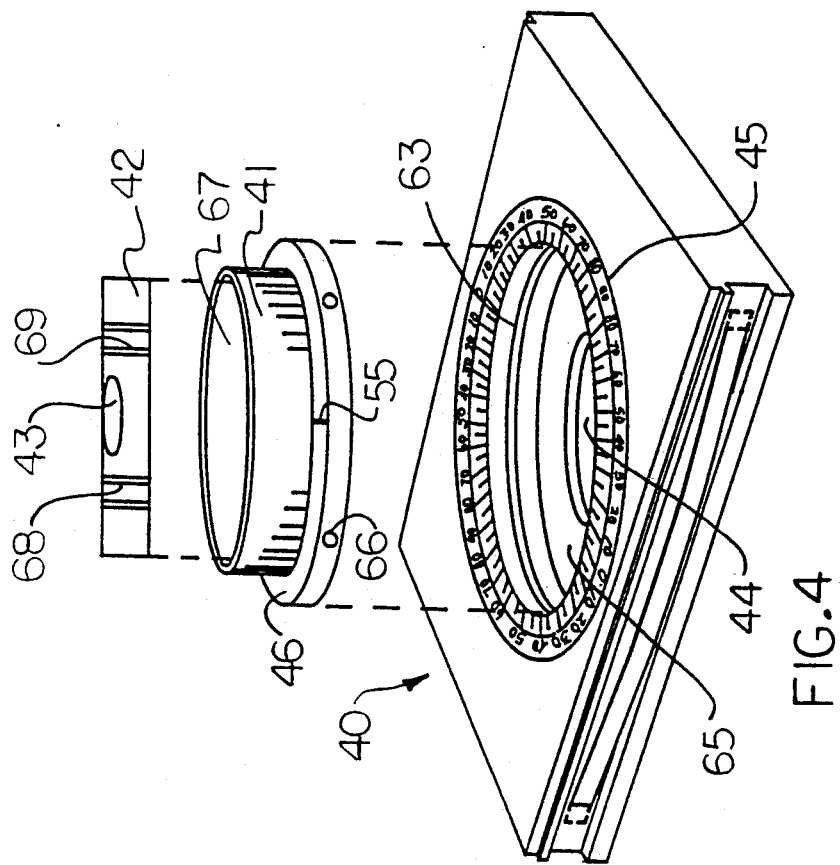

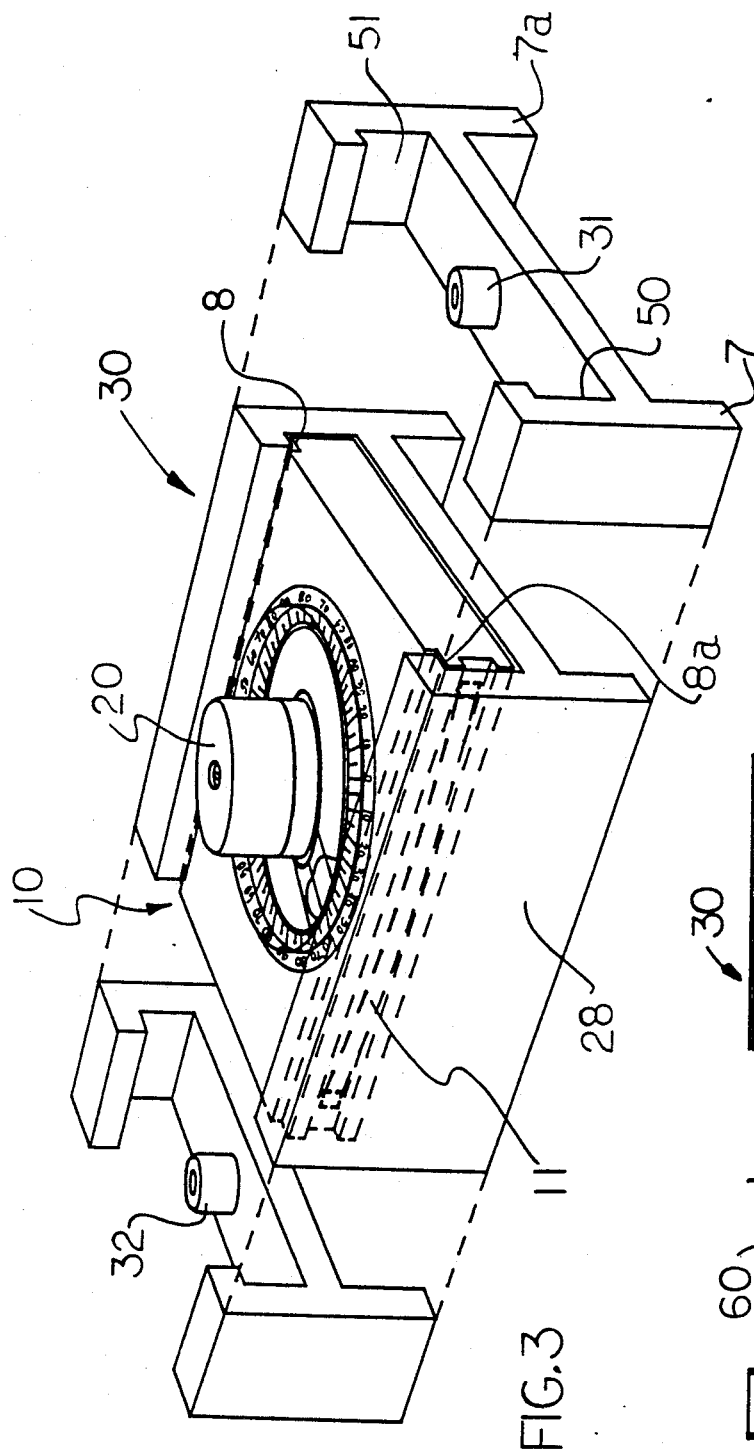
FIG.3
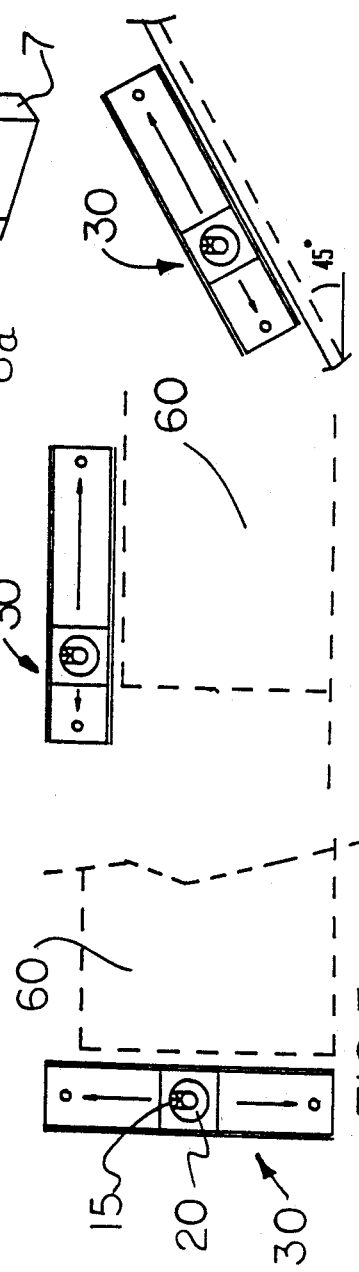
FIG.3c
FIG.3b
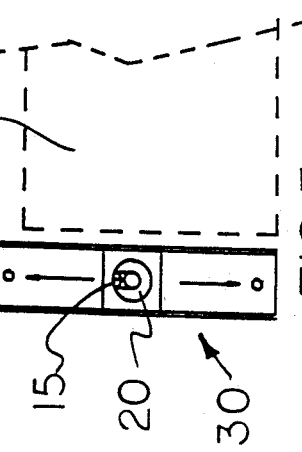
FIG.3a

ANGULAR MEASURING MECHANISM

BACKGROUND OF THE INVENTION

The invention relates in general to the field of measuring devices and in particular relates to devices that measure level, plumb, acute and obtuse angles.

In prior and present times, measuring 0°, 45°, and 90° for building construction purposes have required a carpenter's spirit level which contains a module having a bubble in a vial and permanently located in a wooden or metal bar. This well know apparatus gives accurate readings at the level and plumb positions as long as the module remains in good condition, that is, the glass surrounding the module remains unbroken.

Another aspect of the prior art carpenter's level is that for a relatively long unit at least three or more modules are required to satisfy the various positions of the eye when taking a measurement. This type of assembly is somewhat expensive in view of the redundancy of the modules required of prior art devices.

At the present time, electronic levels represent the state of the art in measuring devices. These products measure level, plumb, acute and obtuse angles but are relatively expensive and require periodic battery replacements. They are three to four times the cost that is applied to a conventional wood or metal carpenter's level and, in addition, their accuracy is sometimes questionable because battery and electronic circuitry changes over time effects measurements being taken.

In view of the relatively high price of the electronic modules and the obvious need to protect such a unit from theft, some craftsman prefer and rely upon the conventional wooden or metal carpenter's level.

The present invention is designed to economize the manufacturing costs associated with the well known multi-module carpenter level and at the same time to provide a new version of the carpenter's level with the versatility of the electronic unit.

SUMMARY OF THE INVENTION

A newly designed rectangular module for determining the level, plumb, and all angular positions of a circle have been provided in this disclosure for use either singly or in various combinations of the invention with slight modification. The module may be used singly or in combination with a carpenter's square or simple ruler; in addition, the module is utilized for slidable engagement with a leveling bar as conventionally used in the building trade. The module, which is formed in a four-sided member employs a bubble in an enclosed liquid containing vial and may have a circular or straight constructional configuration.

In the circular embodiment, the points of the compass in degrees surround the bubble carrying vial. A rotating member having a line indicator is located in proximity to the circular vial for simultaneous viewing of the bubble and the various peripherally located compass points. When the module is placed on one of its sides, the bubble comes to rest at a certain angular position and the rotating member is turned until the indicator intersects the bubble. In view of the close proximity of the indicator to the compass points, the plumb, level, and all other angles of the compass can be easily read for benefit of the artisan user.

The above-described four-sided module is arranged with grooves in three of its side edges and is accompanied by a set screw through the intermediate track. This arrangement allows a single module, which is easily portable on one's person, to be attached to either a carpenter's square or straight edge to allow the artisan to easily and economically measure angles or deviations from certain required angles such as level and plumb.

Another embodiment of the invention allows the module to be positioned for slidable engagement in a metal bar that is used by the building trade to measure the level and plumb positions. The single module of the invention is slidably attached to the leveling bar; and therefore, the single module of the invention is able to replace a plurality of modules in the conventional carpenter's level since it may be slidably arranged to eye level anywhere along its length for easy viewing when plumb, level, and other measurements are taken.

In the module embodiment having a linear vial construction, the latter is located inside a knob for rotating an indicator line with respect to the points of the compass until the bubble is centered. The module of this embodiment may also be coupled for slidable engagement with a metal bar such that the resulting structure also resembles a carpenter's level. As in the previously mentioned embodiment, only one module is required since it can be moved to the eye level for measuring plumb, level, as well as all other angles.

It is an object of this invention to provide a new and improved measuring module.

It is also an object of the invention to provide a new and improved carpenter's level.

It is a further object of the invention to design a carpenter's level such that angular positions between the level and plumb positions may be readily ascertained.

It is also an object of the invention to design a bubble module that can be attached to a simple straight-edge or carpenter's square to provide a modified carpenter's level.

It is a final object of the invention to provide a carpenter's level that is economical to manufacture and more versatile than those now existing in the market place.

BRIEF DESCRIPTION OF THE INVENTION

FIG. 1 is an isometric view of the rectangular module of the invention and including a circular bubble containing vial in combination with a rotating dial and a plurality of angular compass points.

FIG. 2 is a view of the module of FIG. 1 utilized with a carpenter's square or simple straight edge.

FIG. 2a is a side view of the module of FIG. 2 as utilized with a carpenter's square.

FIG. 3 is a view of the module of FIG. 1 and slidably engaged with a carpenter's level.

FIG. 3a represents the use of the carpenter's level as represented in FIG. 3 to determine the plumb position.

FIG. 3b represents the use of the carpenter's level as represented in FIG. 3 to determine the level position.

FIG. 3c represents the carpenter's level as represented in FIG. 3 to determine an angular orientation.

FIG. 4 represents a module of the invention in which a linear vial is employed inside of a turning knob arrangement.

FIG. 5 is a plan view of the module of FIG. 4.

FIG. 6 is a sectional view taken through the vial of FIG. 5.

FIG. 7 is another sectional view taken through the edge support structure of FIG. 5.

FIG. 8 is a sectional view taken through the center of the module depicted in FIG. 4.

DESCRIPTION OF THE PREFERRED EMBODIMENTS

Referring to the drawings and in particular to FIG. 1, a non-electronic module 10 is depicted for determining not only the level, plumb and forty-five degree positions, but in addition is able to produce all other angles of the compass. The module 10 is preferably rectangular in shape and includes the various points 26 of the compass in degree form upon one of its upper surfaces. The compass points 26 surround an opening 14 formed in the top surface of the module 10 and, at the center of the opening a stationary boss 19 is located. The opening 14 formed between the boss 19 and the outer diameter is utilized for seating of a concentric vial 16 in which a measuring bubble 15 is formed.

A circular transparent dial member 18 is oriented above the vial 16 such that its outer diameter substantially covers various lines associated with certain numerics of the compass. The dial 18 incorporates three separated lines 21, 22, 23 for determining the angle being measured wherein the two outer lines are employed by the user to envelop the bubble 15; the third line 21 essentially is an indicator for bisecting the bubble and to align itself with the resulting numeric.

On top of the dial 18 there is located a knob 20 to provide a facile grasping member to allow the artisan such as a carpenter to obtain a desired measurement. The knob 20 includes an opening 24 at its center which acts in cooperation with the center threaded opening 17 of the boss 19. When a threaded bolt (not shown) is positioned in the threaded opening 17, the rotation of the dial 18 is able to occur without affecting the vial 16, which remains stationary.

In the event that the module 10 alone were utilized as a measuring device, all surface edges would be perfectly smooth and, therefore, devoid of any external member. Any edge, although the longer edges are preferable, might be used to measure a surface angle. Therefore, once an edge is placed against the surface to be measured, the bubble comes to rest and the dial 18 is turned until the bubble is enveloped by the lines 22, 23. As understood, if a horizontal measurement is perfectly level, the marker 21 points to 0°; and, if a vertical measurement is taken and it is perfectly plumb the marker 21 is aligned with the 90° point of the compass. On the other hand, if the measurement to be taken deviates from the plumb or level positions, the module 10 is able to indicate the degrees of deviation, which is of considerable assistance to the worker.

The angle measuring module 10 of FIG. 1 is of relatively small size and is, accordingly, made easily portable. By way of example, a small pouch (not shown) may be furnished for storing the module 10 so that it may be carried in a tool belt on the person of the artisan. This combination allows the worker to make quick measurements when more professional equipment is not available.

The embodiment above described may be modified as shown in FIG. 1 into a sliding module. This is accomplished upon one of the longer edges of the module 10 by incorporating a groove 12 in which is located a longitudinal spring 11. Two rails 9, 9a are formed by this groove formation; in addition, two notches 8, 8a are formed on either longitudinal side of the module 10 for purposes that will become evident with respect to the operation described hereinbelow.

In FIG. 3, the modified slidable module 10 is combined with a straight metal bar 28, which is two to eight feet in length, to form the well recognized carpenter's level 30. The metal bar 28 incorporates two flat and parallel surface edges 7, 7a for placement upon a surface which is to be measured. The module 10 is positioned between the grooves 50, 51 for slidable engagement along the edges provided by the notches 8, 8a. The module 10 is prevented from sliding unintentionally in the bar 28 by way of the spring 11 which maintains a slight force against the groove 50. Two end terminals 31, 32 are positioned at either extremity of the metal bar 28 to prevent the module 10 from sliding out of the grooves 50, 51.

As understood in the building trade, for example, either edge 7, 7a is positioned upon a surface whose inclination whether it be level, plumb, or any other angle is to be measured. The slidability of the module 10 is of great convenience to the worker taking this measurement since he may adjust the unit to accommodate his eye position. This feature is particularly noteworthy when the plumb position is being measured and where the module 10 may be easily brought to the eye position. It should be understood that various measurements may be taken with a single slidable module only which is to be contrasted with existing multi-module carpenter's spirit levels.

FIG. 3a represents the level 30 of this invention being utilized to evaluate the plumb of a structure 60. In measuring the plumb, the edge 7 or 7a is positioned against the surface of the structure 60 and the bubble will assume the position depicted. The dial 18 (see FIG. 1) is then rotated so that the lines 22, 23 envelop the bubble 15 and if the indicator 21 is aligned with the 90° compass point, the level 30 has measured a perfectly plumb surface in structure 60.

FIG. 3b illustrates the position of the level 30 when a level measurement of the structure 60 is being taken. In a manner previously described, the bubble 15 will come to a rest position and the dial 18 is rotated until the lines 22, 23 embrace the width of the bubble. If the indicator line is superimposed upon the 0° compass point, a perfectly level inclination has been measured.

The same procedure above described is employed in measuring a 45° pitch as shown in FIG. 3c. In this measurement, the bubble comes to rest at the position depicted. The dial 18 is again rotated until the indicator line 21 bisects the bubble. If the incline is precisely 45°, the line 21 will be exactly aligned with this compass point.

The knob 20 in FIGS. 1 and 3 is made of a rubberized material that is able to absorb shock due to dropping or other harmful effects. This aspect of the module 10 is particularly significant when the level 30 may be dropped from second floor roof heights.

Returning now to FIG. 2 there is illustrated a module 13 used in combination with a carpenter's square 25. The module 13 is identical in operation to module 10 described with respect to FIG. 1 except that it includes grooves formed in several of its side edges. Three of the grooves 57, 59, 59a are respectively located along the bottom and side of the module 13 for purposes that will become clear immediately below.

When the module 13 is combined with the carpenter's square 25, it is conveniently positioned in the corner to provide stability to the unit. This stability occurs when the vertical leg of the square 25 fits into a left-hand groove 59a (shown in dotted form) whereas the level leg of the square fits into the groove 57. To further unite the module 14 with the square 25, a thumb screw 75 is turned until it tightens against the square 25.

The joining of the module 13 of this invention and the square 25 provides a useful combination for the tradesman. As an example, the carpenter's square can readily determine a 90° angle, it cannot determine when this angle is being measured from a perfectly level reference surface. The module 13 is able to evaluate this factor in the manner previously described by a turning of the dial 18 with respect to the bubble placement. In other words, it may easily be determined if the level position from which a 90° angle is being measured is at 0° or several degrees removed from this position. On the other hand, if the artisan wishes to scribe a line with an angle of 22°, for example, the carpenter's angle 25 is turned until the bubble is in the vicinity of this compass point. The dial 18 is thereafter turned until the bubble is bisected by the indicator 21. When the indicator 21 becomes aligned with the 22° point, a line may be drawn using the lower portion of the square 28 as an edge.

The embodiment of FIG. 2 allows for the use of a simple straight edge in place of the horizontal section 6 of the carpenter's angle 25. This arrangement provides a simple and easily portable level for measuring various angles, and therefore, is of significant value for the artisan who must make a quick measurement.

Referring now to the drawing of FIG. 4, there is depicted another embodiment of the invention. This embodiment comprises a module 40 which has a similar shape to the module 10 of FIG. 1 except that is does not include a boss 19. A well 65 having a track 63 along its side is formed and whose purpose will become clear hereinbelow. The various compass points 45 surround the opening 65 in a manner previously discussed. A circular opening 44 is provided for allowing the turning knob 41 to be pushed out of the well 65.

A shelf edge 46 of knob 41 has a diameter that fits into the well opening 65 of the module 40. The knob 41 located on top of the shelf 46 is utilized for grasping and turning the shelf 46 upon which are located diametrically opposed line indicators 55, 55a (see FIG. 5). The knob 41 includes a center portion 67 which is open and allows for placement of a linear vial 42 having a bubble 43. The bubble 43 is positioned between the markers 68, 69 when the module 40 is measuring the horizontal or plumb orientations, for example. In the embodiment of FIG. 4 the vial 42 is oriented along a diameter in the opening 67 which is perpendicular to the diameter passing through the indicator lines 55, 55a.

Strategically placed around an edge of shelf 46 are spring loaded buttons 66 which extend into the circular track 63 to allow for easy rotation of the knob 41, and to allow for positive connection between block 40 and knob 41 without the use of screw connectors.

This aspect of the invention is viewed with greater clarity in the plan view of FIG. 5 and, a sectional view through the button shown in FIG. 7 of the drawings. The button 66 is extended from the edge of shelf 46 via a spring 66a and is compressed when the knob 41 is placed in the opening 44 and the button is positioned in the groove or track 63. Returning to FIG. 5, the module 40 is situated for slidable engagement in the metal bar 47 for use as a carpenter's level. The drawing shows the bubble 43 centered between the markers 68, 69. As understood, the centered bubble 43 together with the markers 55, 55a which are in alignment with the 0° compass points indicate that the carpenter's level is measuring a level surface.

The sectional view of FIG. 6 of the drawings depicts the placement of the linear vial 42 in the body of the knob 41 and shelf 46 as may be viewed in greater perspective in the sectional view of FIG. 8. As may be clearly seen, the knob 41 is placed in a well 65 of the module 40. The module 40 is dimensioned for ease of slidability within grooves 71, 72 of the metal bar 47.

The upper surface of the module 40 is slanted so that the numbers comprising the compass points will not easily wear away over time.

In summary, the present invention furnishes a new and improved module for measuring the various angles of the compass. It may be used above as a small portable device for obtaining a quick reading of the angle; or it may be combined for greater accuracy with other well known tools of the building trade such as the metal bar employed in the carpenter's level and the 90° carpenter's square. The module of the invention which includes a circular or linear bubble containing vial may also be readily combined with a simple straight edge to provide an easily portable measuring tool.

This invention has been described by reference to precise embodiments, but it will be appreciated by those skilled in the art that this invention is subject to various modifications and to the extent that those modifications would be obvious to one of ordinary skill they are considered as being within the scope of the appended claims.

What is claimed is:

1. Angular measuring apparatus comprising:
   a) a support member having at least two parallel sides;
   b) a circular ring-type member for retaining a liquid which includes a movable air bubble;
   c) seating means formed in said support member for stationary seating of said circular member;
   d) a plurality of compass indicia adjacent said seating means;
   e) dial means rotatably attached to said support member and located over said circular member to provide a protective shield, at least a portion of said dial means being transparent,
   f) said dial means including an indicator on said transparent portion for alignment with said bubble and for simultaneously pointing to one of said compass indicia,
   whereby any angle assumed by one of said parallel sides of said support member may be readily determined by aligning said indicator with said bubble via said dial means.

2. An angular measuring apparatus in accordance with claim 1 wherein said dial means is circularly shaped.

3. An angular measuring apparatus in accordance with claim 2 wherein said dial means is entirely transparent.

4. An angular measuring apparatus in accordance with claim 1 wherein said indicator comprises a radial line formed upon said transparent portion near the periphery of said dial means.

5. An angular measuring apparatus in accordance with claim 1 wherein said formed means in the support member comprises
   a) a cylindrical well; and b) a cylindrical boss located in the center of said cylindrical well and said circular member being seated between said cylindrical well and said bore.

6. An angular measuring apparatus in accordance with claim 5 wherein said dial means is attached to said cylindrical base.

7. An angular measuring apparatus in accordance with claim 6 and further including
   a) a knob positioned upon said dial means whereby said knob is further attached to said cylindrical boss;
   b) whereby said knob is utilized to facilitate turning of said dial means.

8. An angular measuring apparatus in accordance with claim 1 and further including
   a) a straight edge having two parallel sides;
   b) means formed on said straight edge to receive said support member for slidable engagement,
   c) whereby any angle may be determined when one of said parallel sides of said straight edge rests upon a surface to be measured.

9. A measuring apparatus in accordance with claim 1 wherein at least three sides of said support member are grooved and, a set screw is located perpendicularly through the groove in at least one of said sides.

10. A measuring apparatus in accordance with claim 9 further comprising,
    a) a carpenter's square upon which said measuring apparatus is positioned, and
    b) said apparatus being attached securely to said square via said groove and set screw, and
    c) whereby said measuring apparatus and square may be utilized to determine the number of degrees from the level and plumb positions.

11. A measuring apparatus in accordance with claim 1 wherein the indicator or said dial means comprises,
    a) three separated lines wherein the two outside lines are separated by a distance that encompasses said bubble, and
    b) said middle line is equidistant between said two outside lines,
    c) such that said middle line is utilized as an alignment means for determining the compass indicia corresponding to said bubble position.

12. A measuring apparatus in accordance with claim 1 and further comprising,
    a spring member for locating along at least one side of said support member.

13. A measuring apparatus in accordance with claim 12 and further comprising,
    a) a longitudinal bar having parallel sides; and
    b) means located on said bar and within the dimensional limits of said parallel sides for receiving said measuring apparatus for slidable engagement along its length.

14. A measuring apparatus in accordance with claim 1 and further comprising,
    fastener means located upon said measuring apparatus for semi-permanent positioning upon a straight edge, or alternatively, a carpenter's square.

15. An angular measuring apparatus comprising:
    a) a straight edge member having two longitudinal parallel sides;
    b) channel means formed on an inside surface of said edge member for positioning a module within the dimensional limits of said parallel sides, and
    c) said module having corresponding track members for mating with said channel means for slidable engagement along substantially the entire length of said edge member and said module comprising,
       1) a support member having at least two parallel sides;
       2) a circular ring-type member for retaining a liquid which includes a movable air bubble;
       3) seating means formed in said two-sided member for stationary seating of said circular member
       4) a plurality of compass indicia adjacent said seating means;
       5) dial means rotatably attached to said support member and located over said circular member to provide a protective shield; at least a portion of said dial means being transparent; and
       6) said dial means including an indicator on said transparent portion for alignment with said bubble and for simultaneously pointing to one of said compass indicia;
    whereby any angle assumed by one of the said parallel sides of said straight edge may be readily determined by effecting said bubble alignment.

16. An angular measuring apparatus in accordance with claim 15 and further comprising,
    a) spring members attached to said two parallel sides to facilitate sliding of said module along said straight edge member,
    b) whereby said module may be located anywhere along said edge member to enable eye contact with the user.

17. An angular measuring apparatus in accordance with claim 15 wherein said straight edge comprises a carpenter's square.

18. An angular measuring apparatus comprising:
    a) a support member having at least two parallel sides;
    b) a circular ring-type member for retaining a liquid which includes a movable air bubble,
    c) seating means formed in said support member for stationary seating of said circular member
    d) a plurality of compass indicia adjacent said seating means,
    e) dial means rotatably attached to said support member and located over said circular member to provide a protective shield, at least a portion of said dial means being transparent; and
    f) said dial means including radially disposed means on said transparent portion which allow alignment with said air bubble and simultaneously pointing to one of said compass indicia,
    whereby any angle assumed by one said parallel sides of said support member may be readily determined by locating said radially disposed means with respect to said bubble to identify a corresponding compass angle.

19. An angular measuring apparatus comprising:
    a) a support member having at least two parallel sides;
    b) a circular ring-type member for retaining a liquid which includes a movable air bubble;
    c) seating means formed in said support member for stationary seating of said circular member;
    d) a plurality of compass indicia adjacent said seating means;
    e) dial means rotatably attached to said support member and located over said circular member, to provide a protective shield; at least a portion of said dial means being transparent;

f) said dial means additionally including a pointer on said transparent portion midway between two equally spaced outer lines designed to embrace the bubble wherein said pointer may be pre-set to a desired angle such that said support member may be positioned upon a surface and turned until the bubble is equally spaced between said two outer lines, and g) said apparatus also allowing a determination of any angle of inclination assumed by said support member upon a surface by turning said dial means until said bubble is placed between said outer lines such that said pointer indicates said unknown angle.

* * * * *